United States Patent [19]

Olsen et al.

[11] Patent Number: 5,905,860
[45] Date of Patent: May 18, 1999

[54] FAULT TOLERANT ELECTRONIC LICENSING SYSTEM

[75] Inventors: James E. Olsen, Park City; Adam L. Bringhurst, Provo, both of Utah

[73] Assignee: Novell, Inc., Provo, Utah

[21] Appl. No.: 08/804,936

[22] Filed: Feb. 24, 1997

Related U.S. Application Data

[63] Continuation-in-part of application No. 08/620,319, Mar. 15, 1996, Pat. No. 5,758,069.

[51] Int. Cl.$^6$ ...................................................... H04L 9/00
[52] U.S. Cl. ............... 395/187.01; 395/186; 395/200.57; 380/4
[58] Field of Search ............................... 395/187.01, 186, 395/200.57; 380/3, 4

[56] References Cited

U.S. PATENT DOCUMENTS

| | | | |
|---|---|---|---|
| 4,870,568 | 9/1989 | Kahle et al. | 707/5 |
| 4,924,378 | 5/1990 | Hershey | 395/187.01 |
| 4,937,863 | 6/1990 | Robert et al. | 380/4 |
| 4,941,175 | 7/1990 | Enescu et al. | 380/4 |
| 5,023,907 | 6/1991 | Johnson et al. | 380/4 |
| 5,047,928 | 9/1991 | Wiedemer | 380/4 |
| 5,097,533 | 3/1992 | Burger et al. | 395/500 |
| 5,103,476 | 4/1992 | Waite et al. | 380/4 |
| 5,138,712 | 8/1992 | Corbin | 395/186 |
| 5,157,663 | 10/1992 | Major et al. | 380/25 |
| 5,182,770 | 1/1993 | Medveczky et al. | 380/4 |
| 5,187,770 | 2/1993 | Mishima et al. | 385/145 |
| 5,201,046 | 4/1993 | Goldberg et al. | 707/100 |
| 5,201,048 | 4/1993 | Coulter et al. | 707/3 |
| 5,204,897 | 4/1993 | Wyman | 380/4 |
| 5,222,134 | 6/1993 | Waite et al. | 380/4 |
| 5,260,999 | 11/1993 | Wyman | 380/4 |
| 5,265,065 | 11/1993 | Turtle | 707/4 |
| 5,278,980 | 1/1994 | Pederson et al. | 707/4 |
| 5,287,408 | 2/1994 | Samson | 380/25 |
| 5,319,705 | 6/1994 | Halter et al. | 380/4 |
| 5,343,526 | 8/1994 | Lassers | 380/4 |
| 5,343,527 | 8/1994 | Moore | 380/4 |
| 5,349,642 | 9/1994 | Kingdon | 380/25 |
| 5,371,792 | 12/1994 | Asai et al. | 380/3 |
| 5,375,206 | 12/1994 | Hunter et al. | 395/712 |
| 5,386,369 | 1/1995 | Christiano | 705/400 |
| 5,438,508 | 8/1995 | Wyman | 705/8 |
| 5,553,143 | 9/1996 | Ross | 380/25 |
| 5,675,782 | 10/1997 | Montague et al. | 395/609 |
| 5,689,638 | 11/1997 | Sadovsky | 395/188.01 |

FOREIGN PATENT DOCUMENTS

| | | |
|---|---|---|
| A-38209/93 | 4/1993 | Australia . |
| A-48113/93 | 3/1994 | Australia . |
| WO 89/04520 | 5/1989 | WIPO . |
| WO 92/20021 | 11/1992 | WIPO . |

Primary Examiner—Ly Hua
Attorney, Agent, or Firm—Dinsmore & Shohl LLP

[57] ABSTRACT

A licensing system provides enhanced flexibility for licensing applications in a network. The licensing system includes a directory services database which stores all license information. The directory services database is accessed by providing a request to a license service provider associated with a server. The license service provider generates an executable entity based on the request parameters, which searches the database and, if the appropriate units are available, assembles a license. The license and the application are then transmitted to the requesting client. All aspects of the transaction are also stored in a database organized according to a transaction's relation to a particular license.

22 Claims, 5 Drawing Sheets

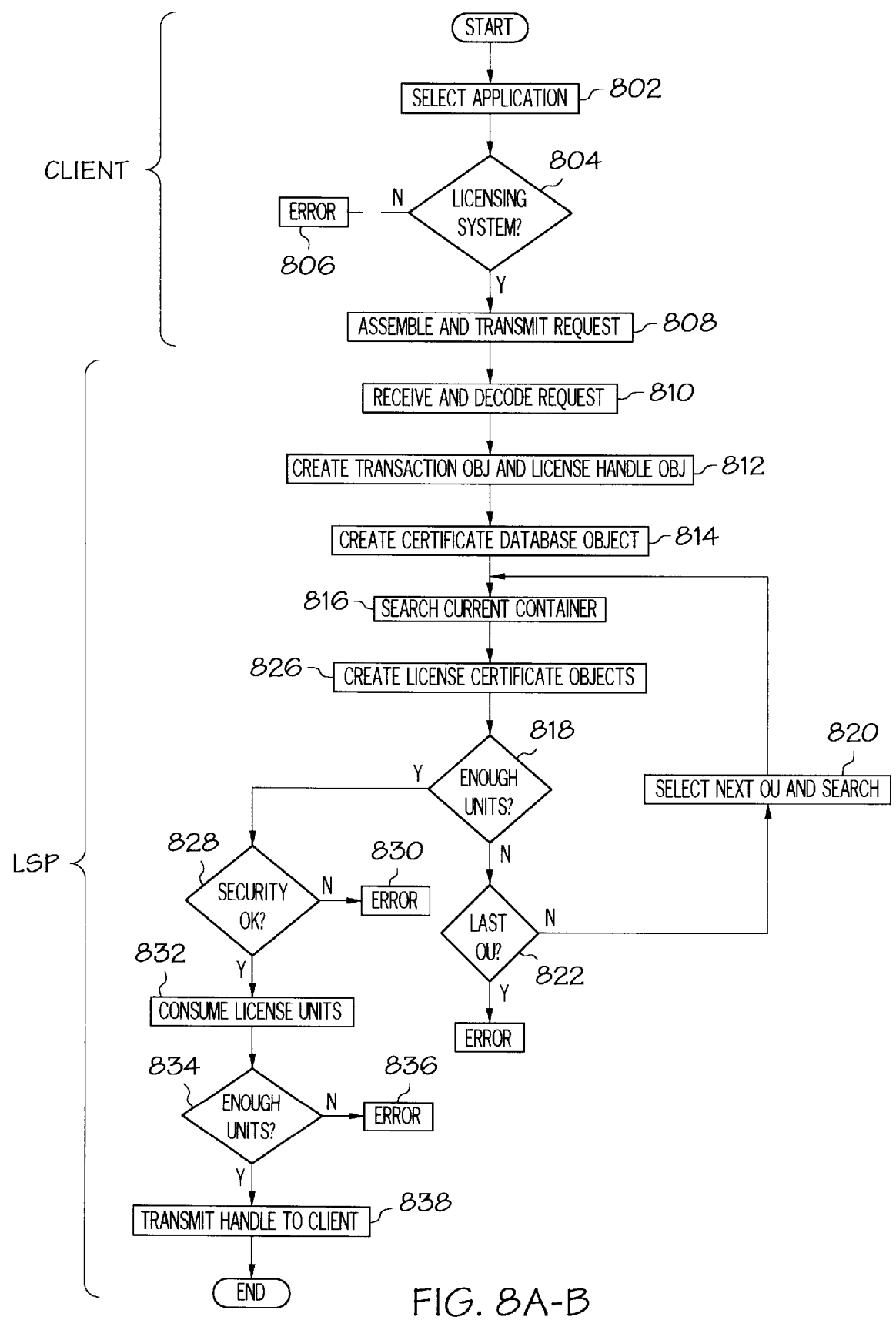
FIG. 8A-B

FAULT TOLERANT ELECTRONIC LICENSING SYSTEM

CROSS-REFERENCES TO RELATED APPLICATIONS

This is a continuation-in-part of U.S. patent application No. 08/620,319, filed Mar. 15, 1996, now U.S. Pat. No. 5,758,069.

BACKGROUND OF THE INVENTION

1. Field of the Invention

The invention relates to licensing software, and more particularly, to licensing software electronically in a network environment.

2. Description of the Related Art

Most software vendors currently favor licensing as the preferred method of distributing software. Licensing software provides the vendor with a certain amount of control which may be used to the vendor's advantage. For example, licensing software allows the vendor to prohibit unauthorized usage of the software that might facilitate unauthorized copying. In addition, licensing provides an advantageous method of providing and billing for software. Through licensing, the vendor may sell several identical copies of the same software and charge the buyer for each copy.

Licensing schemes have been adapted for the network environment as well as the individual personal computer. In a network environment, such as a client-server network, multiple users may access the same copy of a particular application. Consequently, the vendor can charge the network owner not for the number of copies installed on the network, but for the number of users having access to the software.

Software is conventionally licensed using an agreement between the vendor and the user or administrator. The agreement is typically either a conventionally signed contract or a "shrink wrap" agreement attached to the packaging for the software, to which the licensee acknowledges agreement by opening the package.

Although traditional and shrink wrap licensing are more or less applicable to individual systems, they are not well-suited to the network environment. Both traditional and shrink wrap licensing schemes are difficult to enforce on a network where several users have access to the software. Consequently, various electronic systems have been devised for controlling access to software on a network.

Electronic licensing typically comprises providing a set of criteria under which a request for an application from the server should be granted. One common licensing system uses a fixed set of licenses controlled by a license server. The license information is maintained in a license database, along with information regarding which applications are in use and how many units are still available. The information in the database may be encrypted to prevent forgeries. When an application is desired, the application commences running. Code embedded in the application initially requests a license from the server to facilitate the execution of the application. The server checks the database of licenses, and if the appropriate licenses are available, grants the request. As requests are received and licenses granted, the relevant information is logged into a file to track usage of the various applications.

If a license is not available, the client contacts another server to find the appropriate license. The client in the conventional system has the responsibility to obtain licenses from the various servers, and the individual servers provide resources at the client's request. To facilitate such licensing, the application typically includes a library of programs designed to contact the server, request a license, and track the resulting license.

Although such a licensing system provides some security against unauthorized usage of applications, it suffers several drawbacks. For example, the number of programs required for the client to request and maintain licenses occupies a significant portion of the client's limited memory resources. Further, a conventional licensing system stores most of the licensing information in the client's memory. Consequently, in the event of a client crash, the licensing information is lost and difficult to reconstruct.

Conventional licensing systems also suffer limited scalability. When a call is made to a server, all of the execution occurs on each individual server for any particular call. Similarly, if a license is located on a particular machine, all execution necessary to operate on that license occurs on that machine. Consequently, a central server containing most of the licenses available on a particular network may be overworked while other, more local server resources remain idle. Similarly, if any particular server crashes or otherwise becomes unavailable, none of the licensing information associated with that server can be accessed by clients, even if other servers are operating.

In addition, conventional licensing systems rely on code embedded in the application to establish the licensing attributes. Code is placed in the application which interprets information received from the server to establish licensing parameters. Because the behavior of the license is not established until after the request has been made and the license obtained, the user cannot read the license terms prior to the request. Moreover, this system lacks flexibility. To change the licensing terms, the code in the application must be revised.

An electronic software licensing system is thus needed which overcomes the shortcomings of the prior art.

SUMMARY OF THE INVENTION

An electronic licensing system according to various aspects of the present invention provides alternative methods and apparatus for licensing software in a network environment. License information is suitably stored in a distributed database among several servers. In the preferred embodiment, the license information is stored and accessed in conjunction with a directory service, such as Novell Directory Services (NDS). The license information may be coupled with any suitable attributes to create a desired licensing policy. Clients are equipped with a suitable library of application programming interfaces (APIs) for acquiring and managing licenses. To request an application, the client assembles a request having the desired license criteria, such as the publisher, product, version, and number of license units. This information is provided with other relevant information, such as the user's name.

When the request for a license to an application is received by a local server, the server uses the directory service to locate license information which satisfies the request criteria. If the requested license information is available to the requesting client, a license service provider (LSP) constructs a license certificate object and collects that information into the license certificate object. If the license units are available to grant the request, the information in the directory services database is then adjusted to reflect the granting of the license. The directory services system then suitably replicates the data according to a corresponding partitioning and replicating scheme to maintain the integrity of the licensing information.

In a system according to a preferred embodiment of the present invention, most of the license transactions occur at the servers; the client merely bundles the arguments for a license request and transmits them to the server. Consequently, the client resources required for the license system are relatively small.

In accordance with a further aspect of the present invention, recoverability of the system is enhanced. To anticipate a client crash, the client only needs to store a license handle associated with the license request. The remaining information is stored in the server database, and may be reestablished by finding the particular transaction associated with the license handle in the NDS database. Further, a licensing system according to various aspects of the present invention is highly fault tolerant in the event of a server crash. Because the directory services system automatically replicates licensing information among various servers, license information associated with a particular server is not lost or unavailable if the server fails. Instead, the information may be retrieved from another server which has received a replica of the licensing information.

In accordance with yet a further aspect of the present invention, licensing flexibility is also enhanced. The licensing criteria may be adjusted by revising the contents of the NDS database and the client APIs. Because the application requires no particular code to facilitate licensing, recompilation or re-linking of the application binaries is unnecessary to change the licensing attributes. In addition, the structure of the database and the APIs facilitates the use of unconventional licensing modes by applying various different criteria to the license information in the database and the license request. Further, the distributed nature of the database provides enhanced scalability and allows several servers to be searched with a single request from the client.

BRIEF DESCRIPTION OF THE DRAWING FIGURES

The subject matter of the invention is particularly pointed out and distinctly claimed in the concluding portion of the specification. The invention, however, both as to organization and method of operation, may best be understood by reference to the following description taken in conjunction with the claims and the accompanying drawing, in which:

FIGS. 1A–B are a block diagrams of a network according to various aspects of the present invention;

FIGS. 8A–B comprise a flow diagram of a process for requesting and generating a license for an application.

DETAILED DESCRIPTION OF PREFERRED EXEMPLARY EMBODIMENTS

Figure 1A:
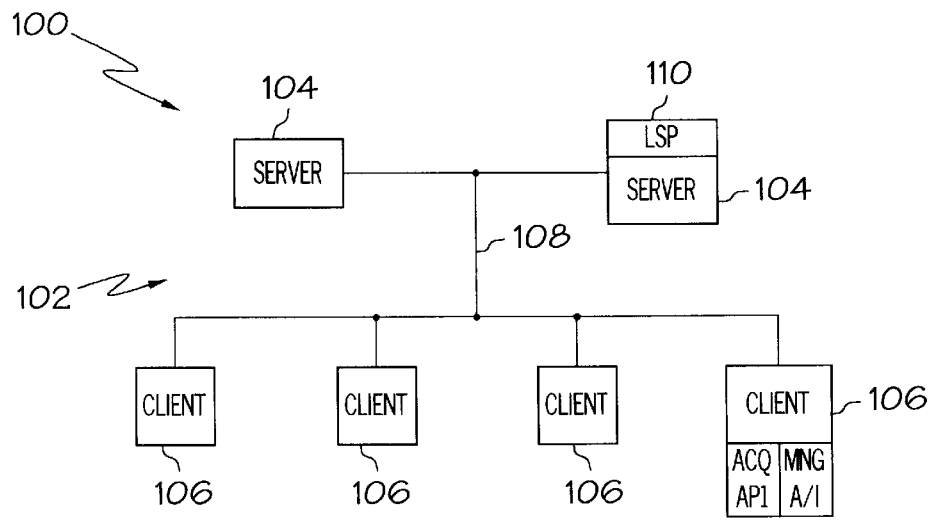
Figure 1B:
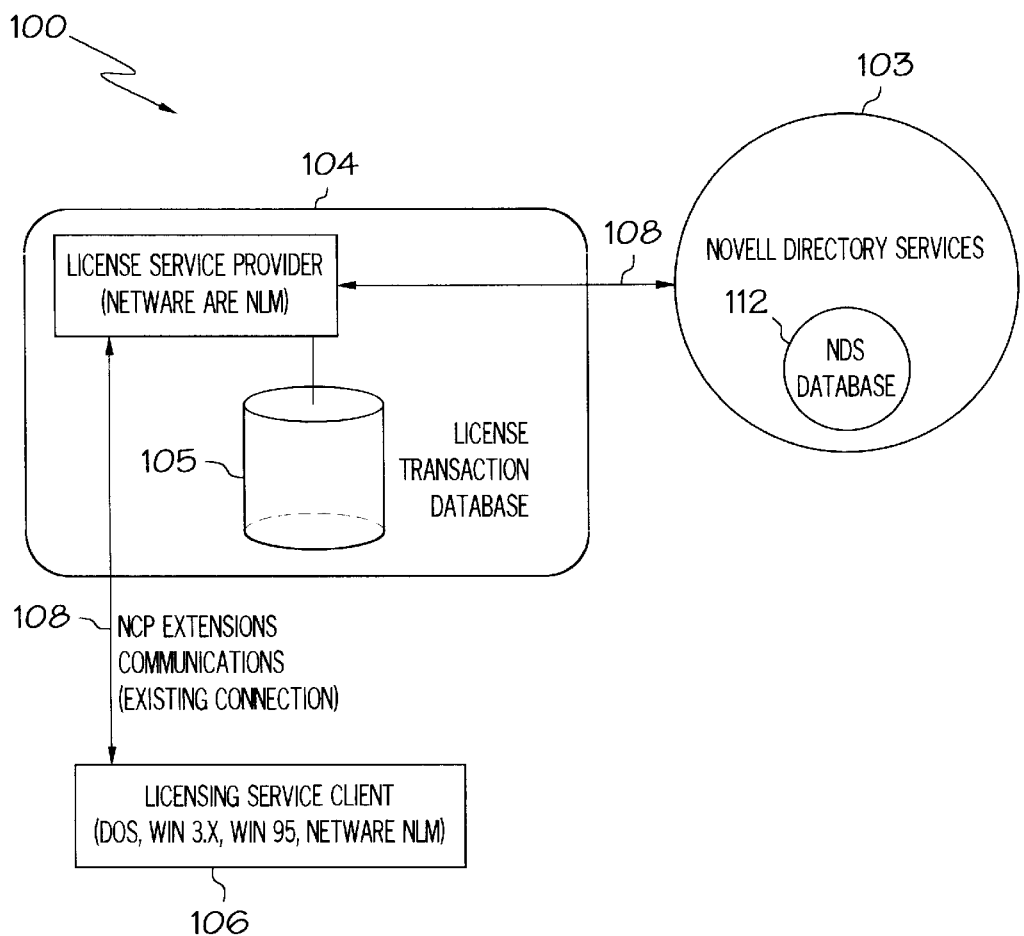

A licensing system according to various aspects of the present invention provides a flexible, robust, and fault tolerant licensing apparatus and method for licensing software in a network. Referring now to FIGS. 1A and 1B, a licensing system 100 according to various aspects of the present invention suitably includes a network 102 comprising a plurality of servers 104, at least one client 106, and a communications system (e.g., a network bus) 108. Each server 104 suitably comprises a high-speed computer operating on a network operating system, such as a Novell NetWare server operating system. Any suitable operating system, however, may be utilized in accordance with the present invention.

Figure 4:
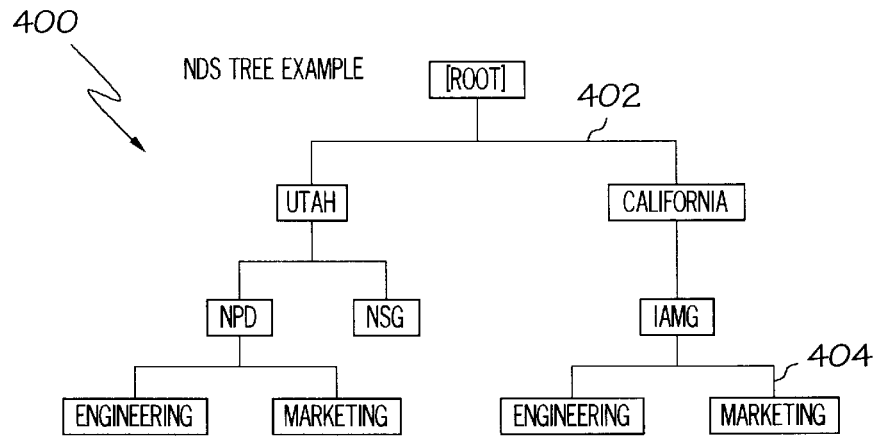
FIG. 4 is a block diagram illustrating an example configuration of a network serviced by a directory service.

The network 102 is suitably configured for distributed processing and to accommodate a directory services system. In a preferred embodiment, the directory services system comprises a multiple-platform, distributed network directory service, for example NOVELL DIRECTORY SERVICES™ (NDS™) 103, which provides global access to network resources regardless of where the resources reside. NDS 103 includes a global, distributed information system that maintains information about every resource associated with a network, including users, groups, printers, volumes, and other devices. The information is preferably organized as a collection of objects, each object representing a particular device, module, application, file, or the like. Information relating to the various resources may be organized and presented to the administrator in a hierarchical tree structure. For example, referring now to FIG. 4, a tree structure 400 may be organized into a series of branches 402, sub-branches 404, and so on, which may correspond to particular user groups, device types, geographical location, or other suitable classifications. Similarly, the sub-groups may, in turn, be organized by dividing and sub-dividing resources into individual branches as may be convenient. Each group, sub-group, or the like is typically referred to as a particular context, container, organizational unit, or the like according to the particular configuration of the network 102.

NDS 103 provides a host of functions in conjunction with a licensing system according to various aspects of the present invention, including, for example, organization, location, and replication of various components. NDS 103 allows the network 102 to be organized in a logical manner for administration, applications sharing, document sharing, and the like. The directory service organization may further be used to control and facilitate searching for license information by the various LSPs 110, as described in greater detail below.

In the present embodiment, the directory services system suitably includes a distributed database 112. The NDS database 112 is configured to automatically replicate information in the NDS database 112 and store the replicated versions at alternative locations in the NDS database 112. Replication of the information in the NDS database 112, including the license information, provides fault tolerant login, administration, and licensing services. More particularly, the NDS database 112 is typically separated into multiple distributed sections, known as partitions, which are distributed across the network 102. NDS partitions are replicated and updated among various memory locations within the network 102 according to pre-selected procedures as many times as may be necessary or desirable to provide effective fault tolerance. The NDS system 103 automatically updates information across the network 102 as data associated with a particular partition is modified. Thus, if a primary partition is lost due to a server crash or other cause, the NDS system 103 automatically reconfigures itself to use an alternate copy. It should be noted, however, that the replication process of the NDS system 103 may be limited or controlled to optimize the efficiency of the licensing system. For example, servers that do not include an LSP or otherwise provide licensing services may not need to replicate license-related data.

In the present embodiment, at least one of the servers 104 has access to the NDS database 112, which is suitably managed by NDS 103. In particular, NDS database 112 stores all of the information relating to the various licenses available via the LSPs 110. The license information in the NDS database 112 is suitably organized into license record objects, each of which suitably contains a license certificate supplied by a vendor or other installer along with additional information relating to, for example, the location of assignment information and user information.

In the preferred embodiment, two extensions are used to provide infrastructure for creating and maintaining stored license record objects, a product schema extension and a certificate schema extension. The product schema extension provides a reference mechanism for locating license record objects, and suitably corresponds a series of attributes, for example corresponding to the publisher, product, and version of a licensed application. The product schema extension may be located within a particular organization or organizational unit in the NDS system 103 to organize similar or related license record objects in the organization or organizational unit.

The certificate schema extension corresponds to individual stored license record objects. An instance of a license record object subject to a certificate schema extension only exists within product container subject to a product schema extension. All of the license record objects associated with a particular application version and located in an organizational unit, for example, are suitably associated with a single product container. Associating various license record objects with product containers facilitates searching for license units without examining every object in the organizational unit.

The license certificate is stored in the license record object in a block copy fashion, so that all of the data and structure of the certificate are preserved. The license information stored in directory services database 112 is suitably stored in a format common to each license record object. Additional memory space is also suitably provided for information required by licensing system 100. For example, memory space may be provided for entry of information relating to the user, license handle, number of license units consumed, the last time of update, assignment, and owner. Each license record object is suitably extendable by adding additional identifiers that may be recognized by executable license certificate objects.

Figure 3:
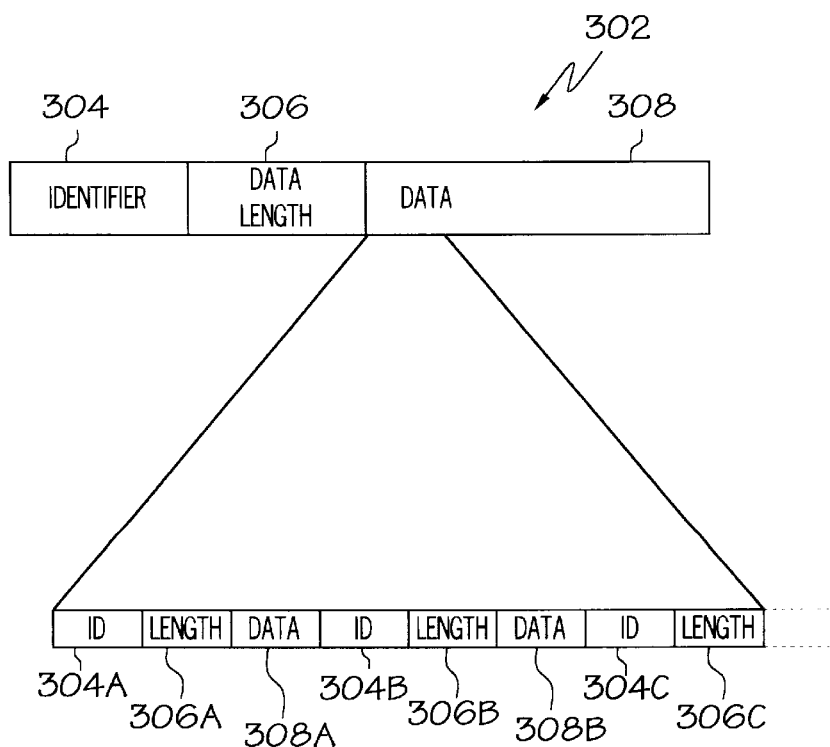
FIG. 3 is a diagram of the organization of a license record object.

Referring now to FIG. 3, a suitable format for a license record object 302 comprises an identifier field 304, a data length field 306, and a data field 308. A suitable identifier is stored in identifier field 304, for example to identify the nature of the license record object 302. Data length field 306 describes the length of data field 308, suitably in bytes. Data length field 306 suitably comprises a four byte number, for example in little endian format. Data length field 306 may be read to determine where the current license record object 302 ends and where the next license record object 302 begins.

Data field 308 suitably contains information specific to the license. Data field 308 is formatted in any suitable manner to be compatible with licensing system 100. In particular, data field 308 suitably contains nested sets of identifiers, data length fields, and data fields for various characteristics and variables associated with the license record object. For example, each entry in the data field suitably includes an identifier 304A–C which indicates the type of information in the entry, e.g. an error attribute, ownership data, etc. A data length field 306 A–B indicates the length of the entry, and a data field 308A–B includes the actual information. The format may suitably be determined according to a portion of the identifier, so that if licensing system 100 does not recognize the relevant portion of identifier field 304, data field 308 is ignored. The information stored in data field 308 is provided by license installation or creation, as described further below.

The data fields 308 suitably include both static and dynamic portions. The static portions are set once when the license record object is installed on the directory services database 112 and remain unchanged for the duration of the license. The dynamic portion may be changed as the license certificate is utilized and thus manipulated.

In the preferred embodiment, the dynamic and static portions are suitably stored in a single multi-valued attribute. The static portion includes the actual license certificate binary in its original form. Storage of the original binary facilitates authentication mechanisms employed by the licensing system and/or the associated application. Because information is typically only added to the record to describe units in use, i.e. in the dynamic portion, unauthorized manipulation of the license certificate is inhibited. The dynamic portion of the license record object stores information relating to its current state, which allows the object to be modified and transmit the modifications to the next process using the license record object. This allows certain values in the object to be manipulated without affecting the other values.

At least one server 104, and preferably multiple servers 104, further includes an LSP 110 for performing license transactions. LSP 110 performs several licensing functions, for example receiving requests from clients 106 and maintaining and searching the NDS database 112. LSP 110 is implemented in any suitable manner, for example in software, suitably comprising a NetWare Loadable Module in the operating system.

Figure 2:
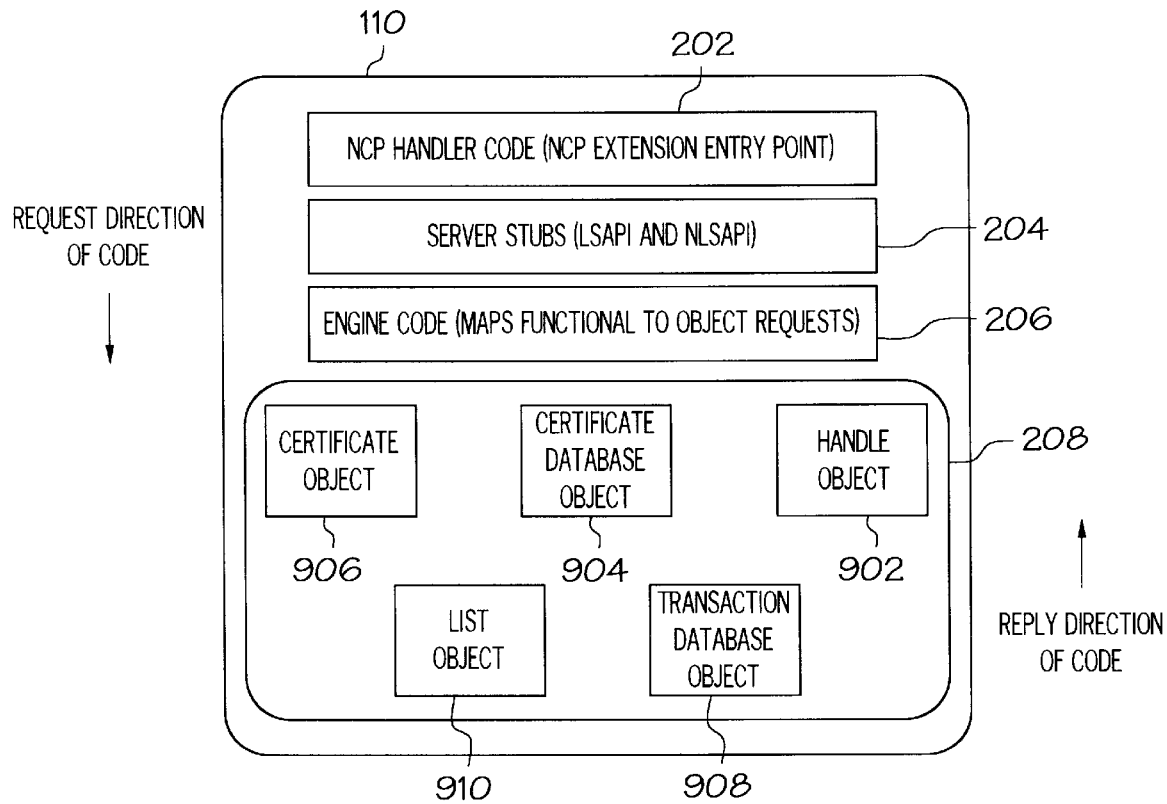
FIG. 2 is a block diagram of the LSP of FIG. 1.

Referring now to FIG. 2, LSP 110 suitably comprises a NetWare Core Protocol (NCP) Extension Entry Point code, which is referred to as the NCP handler 202; a server stubs module 204; an engine code 206; and a plurality of implementation objects 208, which may be generated, stored, and destroyed as necessary by the LSP 110 to fulfill its functions. The NCP handler 202 receives messages from clients relating to various licensing functions. To handle multiple messages, the NCP handler 202 suitably processes several requests concurrently. NCP handler 202 notes the message contents, as well as the source of the message to establish a return location. To initiate fulfillment of the request, the NCP handler 202 transfers control of the request to the server stubs module 204 or to a queue to await processing.

The request is sent to the server stubs module 204 with the request information and the client information received from the client 106. The server stubs module 204 dissects the information received from the NCP handler 202, initially determines which particular function is requested, and converts the message into an appropriate format for the other components of the server 104. Based on the type of transaction, the server stubs module 204 then parses out the appropriate arguments from the message and transfers the results to the engine code 206.

The server stubs module 204 may perform different tasks according to the type of request received. For example, the server stubs module 204 suitably includes at least two sections for parsing client requests in the present embodiment. A first section parses functions in the LSAPI, which is submitted by the client 106 for requesting licenses. A second section parses functions located in the NLSAPI, which is suitably submitted for managing licenses.

When the engine code 206 receives the results from the server stubs module 204, the engine code 206 first checks all arguments for validity, and if any arguments fail, returns a rejection message to the client 106. If the arguments are valid, the engine code 206 translates the arguments from the particular functional request for licenses or information into an appropriate implementation object 208. In addition, the engine code 206 translates results from an implementation object 208 and returns the appropriate error codes or other information to the client 106.

Figure 6:
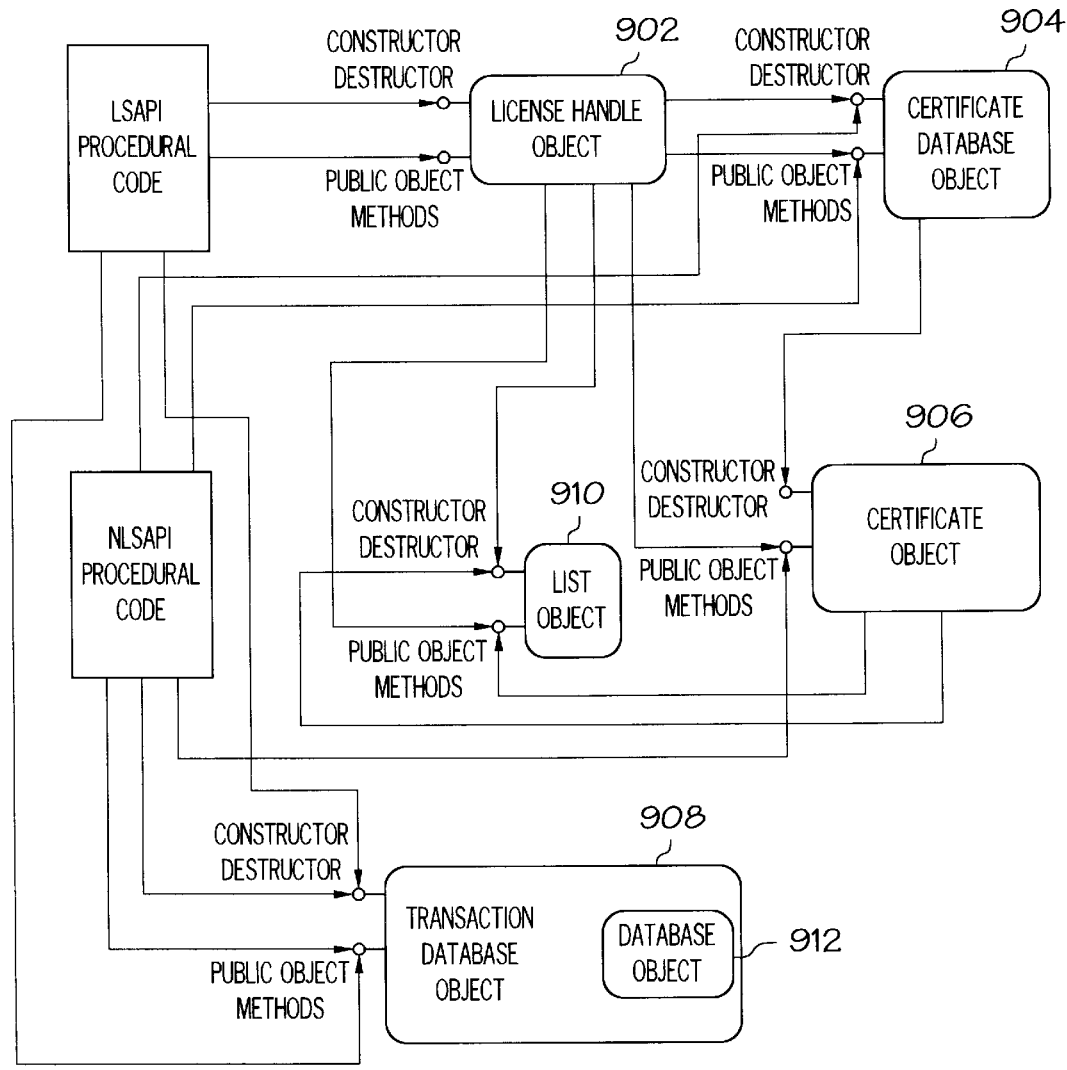
FIG. 6 is a block diagram of a series of implementation objects generated in response to requests.

The implementation objects 208 are suitably initiated by the engine code 206 and create, locate, obtain, and manipulate license record objects in the NDS database 112. The implementation objects 208 may further include objects for tracking license transactions and keeping records. For example, referring now to FIG. 6, the implementation objects 208 suitably include a license handle object 902, a certificate database object 904, a license certificate object 906, and a transaction database object 908.

Upon receipt of a license request, for example an LSAPI, the engine code 206 suitably generates a license handle object 902. The license handle object 902 functions as an object representation of the functionality of the request. Further, the license handle object 902 assigns a unique identifier to the request for identification and record keeping purposes.

The certificate database object 904 uses the information from the engine code 206 to find license record objects conforming to the request criteria. For example, the certificate database object 904 suitably receives a combination of publisher name, product name, version, and license handle. After the certificate database object 904 has been created, it may be used to search through license record objects in the NDS database 112 or to retrieve specific license record objects. The certificate database object 904 retrieves the necessary information from the NDS database 112 and passes the binary state information to the constructor of the license certificate object 906. The certificate database object 904 provides access to the license record objects without regard to the underlying certificates' policy attributes.

To access the NDS database 112 and perform various functions, LSP 110 suitably assembles a license certificate object 906 for any particular license record object installed in the NDS database 112. The license certificate object 906 provides for all of the basic manipulation of a single license record object. A license certificate object 906 suitably comprises code for performing various functions within the NDS database 112, such as adding, removing, requesting, and releasing a license certificate. In addition, the license certificate object 906 suitably provides information regarding the corresponding license record object and its state. For example, based on the user information or a license handle, the certificate database object 904 suitably locates the corresponding license record object and constructs a license certificate object, which transmits information relating to the current users, number of units in use, identifier information, default update period, ownership information, and the like to the requesting client 106.

The license certificate object 906 also suitably performs various license management functions in response to an NLSAPI. For example, the license certificate object 906 facilitates adding assignment information to license record objects to assign or remove access rights for particular users to an application. In addition, assignment of the license may be transferred to another user or group using the license certificate object 906.

The license certificate object 906 also suitably provides for removal of stale entries.

The license certificate object 906 monitors updates received from the various clients 106 to indicate that the application is still in use. As described further below, if the update is not received within the appropriate update interval, the license certificate object 906 terminates the license by performing a release operation. This configuration facilitates modification of the license characteristics without affecting or modifying the API implementation code associated with each client 106.

The server 104 further suitably includes a transaction database 105 for storing information relating to various licensing transactions. The transaction database 105 suitably comprises a local database associated with a server 104, unlike the NDS database 112.

The LSP implements a transaction database object 210 which operates as an interface with the transaction database 105 and tracks the usage history of a license handle object in the NDS database 112. Transaction database object 210 suitably includes relevant usage information relating to the corresponding license handle object, such as when license units are consumed, when updates occur, when license units are released, and error conditions. Transaction database objects 210 suitably organize information relating to licenses in transactional records based on each license handle. For example, information relating to each transaction affecting or based on a particular license handle is recorded in a transaction record devoted to that license handle. Consequently, unlike a chronological log, determining the usage history of a particular application does not require a search of an entire database. In contrast, all of the relevant information is stored in a record associated with an identifying license handle.

Other useful implementation objects 208 may also be added to facilitate or simplify management and manipulation of the license record objects in the NDS database 112, such as a list object 910. A list object 910 may be used for generating and maintaining any type of list of items. For example, a user may create a list object and then add items to the list to organize items in the NDS database 112. Users can then access items iteratively or search for a specific value within the list. Other useful, additional objects include a database object 912 for providing a simplistic abstraction of a database for very simple functionalities of a database.

Referring again to FIGS. 1A–B, the client 106 suitably comprises a conventional network terminal, for example a personal computer or workstation. The client 106 is suitably connected to the server 104 through a conventional network interface. To operate in conjunction with the licensing system 100, the client 106 suitably includes a series of application programming interfaces (APIs). The specific APIs provided may conform to the particular platform on which the client 106 operates.

The APIs are suitably provided to the client 106 by a client provider or library. The client provider, suitably comprising a module loaded into each client 106 including a combination of libraries and DLLs, provides the licensing APIs and a remote procedure call (RPC) mechanism for the client 106. The client 106 requests access to and manages applications using the APIs. The RPC mechanism both locates and communicates to LSPs 110. Finally, the client provider also suitably performs various library maintenance routines as may be necessary for the various shared library formats.

The client 106 uses a series of functions gathered in the APIs furnished by the client provider to request licenses from the LSP 110. The APIs are suitably linkable or addressable entities according to the particular platform used by the client 106. The licensing API library associated with the client 106 is suitably configured in a standard format, for example the industry standard called the LSAPI (v1.1), jointly created by Novell, Microsoft, HP/Gradient, and several other companies. Other API configurations may also be provided for different functions or to operate in conjunction with different platforms. The APIs generally provide for the acquisition and management of the licenses. The client 106 according to various aspects of the present invention suitably includes at least two library sets. The first library set provides the license acquisition API, and the second is the license management API.

The license acquisition API provides for obtaining, maintaining, and releasing license units corresponding to a particular application. The license acquisition API preferably provides license acquisition functions compatible with a broad array of platforms employed by licensing system 100 platform so that software developers are afforded considerable flexibility in designing applications which may be conventionally licensed in the context of the licensing system 100. Preferably, the application requires very little information about the licensing system's 100 particular process for acquiring and constructing licenses.

The calls used to provide this functionality suitably correspond to industry standard APIs, such as the common licensing API, or LSAPI, version 1.1, as described above. The standard API allows a server 104 to license applications independent of the underlying licensing system 100. The license acquisition API facilitates requesting, updating, and releasing licenses, establishing the update period for licenses, and translating error codes.

The license management API (NLSAPI) suitably provides access to information that directly pertains to the license acquisition process. In addition, the license management API also suitably provides for configuring and examining the licensing system 100. The license management API is useful as an administrative tool and in a software management system. The license management API facilitates determination of, for example, license usage, license restrictions, license installation and information, and transactional records. Further, the license management API suitably provides calls for adding and removing license assignments from a license certificate, transferring ownership, and installing a license certificate, for example into the NDS database 112.

Each respective client 106 communicates with the various servers 110 over communications system 108. The communications system 108 suitably comprises a series of transmission channels connecting servers 104 and clients 106, including various supporting hardware and software. The communications system 108 facilitates communications between two or more servers 104 and between servers 104 and clients 106. The communications system 108 comprises any suitable communications medium, such as conventional copper wire, fiber optics, or wireless signals.

Client-server communications are suitably transport independent, for example using NCP extensions. Client communication components are preferably single sourced across all platforms to increase portability. For example, NWCalls from Novell may be used, which provides a platform independent mechanism for accessing Novell NetWare resources.

To communicate with the LSP 110, the client 106 first locates an LSP 110, and then communicates its request to the LSP 110. Each LSP connected to communications system 108 suitably registers its handler 202. Consequently, when client 106 seeks LSP 110, it suitably If scans its connections for an NCP handler 202 registered with the appropriate name.

Figure 5:
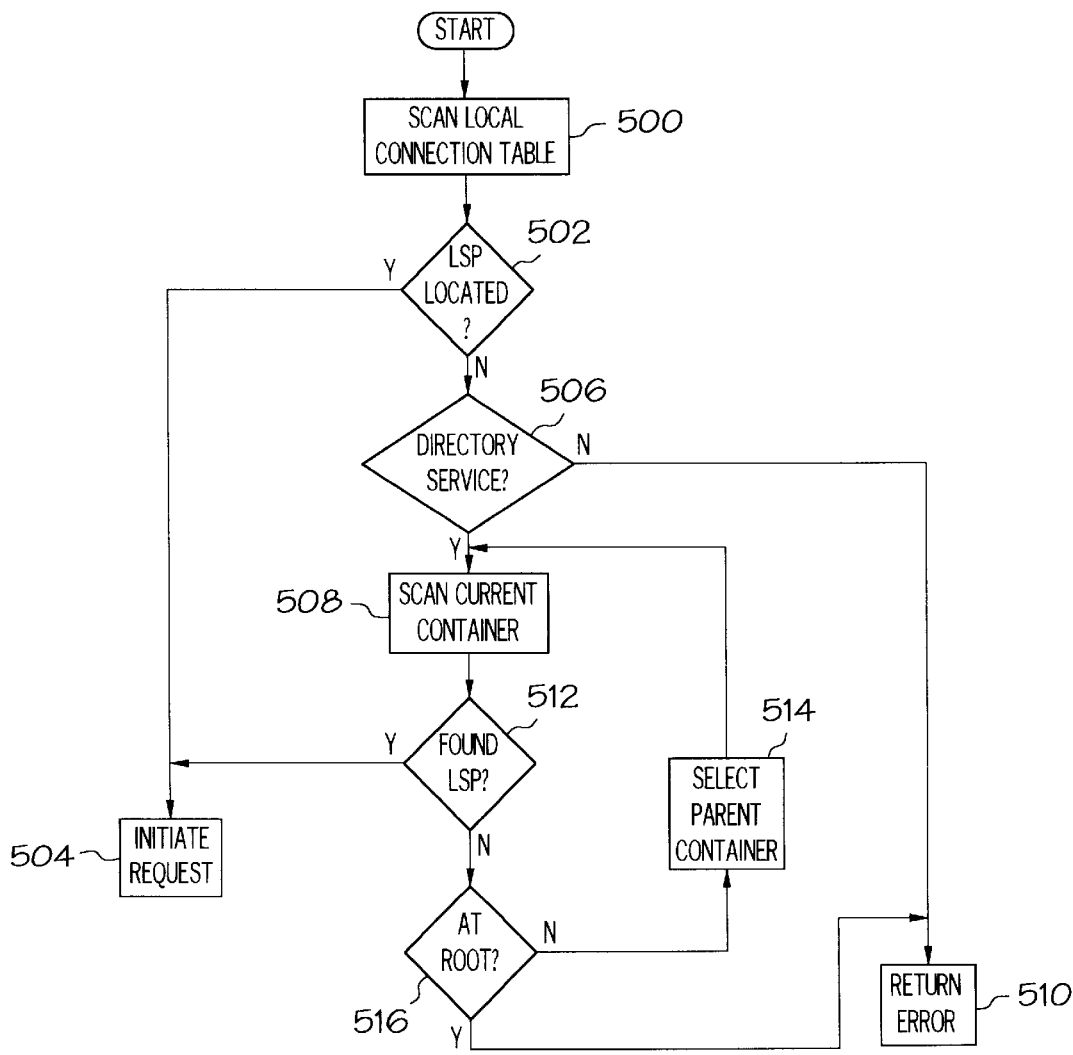
FIG. 5 is a flow diagram of a process for a client to locate an LSP.

For example, referring to FIG. 5, to locate an available LSP 110, the client 106 suitably scans its local connection table for the NCP service name providing the licensing service (step 500). If an LSP 110 is located (step 502), client 106 initiates its request, suitably using an appropriate RPC (step 504). In a preferred configuration, a suitable transport mechanism comprises NCP extensions. If an LSP 110 is not located, client 106 determines whether the directory services system is available (step 506). If the directory services system is currently unavailable for some reason, an error arises indicating that no LSP 110 could be located (step 510).

If the directory services system is available, the current directory context is scanned for available LSPs 110 (step 508). If no LSP 110 is located in the current container (step 512), client 106 begins searching the parent container (step 514). The search continues through the parents of the current container until the root is reached (step 516). If no LSPs 110 are found, the client 106 receives an error indicating that the licensing system 100 is not available (step 510). If an LSP 110 is found, the client 106 connects to the located LSP 110 and transmits its request and continues its communications (step 504).

Each LSP 110 is suitably associated with various attributes which indicate the status of the particular LSP 110. For example, suitable attributes include transactional database attributes and an NCP pointer. The transactional database attribute may indicate whether the LSP 110 is configured to support a transactional database 105. The NCP pointer facilitates location of and communication with the corresponding NCP server object.

To facilitate licensing of the various applications, the license information relating to licensed applications is installed in the NDS database 112, suitably in the form of a plurality of license record objects. The license information is suitably provided by the vendor to facilitate access to applications. The information stored in the NDS database 112 is suitably collectively available to each of LSPs 110 via NDS 103. Consequently, each LSP 110 suitably has access to certain license information, depending on the LSP's position in the hierarchical tree in the directory services system and the privileges and limitations imposed upon the individual LSP 110 by the network administrator.

The license system 100 according to various aspects of the present invention allows various users to control entry and maintenance of licenses other than the administrator. When a user enters a license into the license system 100, the installer may be considered the "owner" of the license. Only users having sufficient security clearance may modify or delete the installed license. Ownership of the license may also be transferred to other users.

When a license is installed in the LSP 110, the administrator may assign a license to any NDS distinguished name, which may correspond to, for example, an individual, machine, group, or container. If no assignment information is provided, the application may be suitably treated as available to any client or user. The application corresponding to the license is then only available to a user with a proper security assignment. The assignments are suitably additive, such that multiple groups, machines, users, or containers may be assigned to a single license. Similarly, licensing system 100 provides for removal of particular assignments, suitably one assignment at a time.

The information to support a license record object in the NDS database 112 is suitably created using a license creation utility. The license creation utility also suitably facilitates various policy control functions, such as modification of default installation parameters. The license creation utility allows the administrator to fit licensing system 100 to particular needs.

For simplicity, the license creation utility suitably includes a series of default installation parameters. For example, the license creation utility may include one or more license creation templates. License creation templates describe detailed policies for license generation and behavior at the client 106. A series of default templates may be provided for implementing various standard licensing models. The license creation utility suitably prompts the installer, such as the administrator, for all information relating to the required entries, such as publisher, product, and version identifiers. In addition, the license creation utility may be adapted to request information suited to the particular network 102 or licensing system 100 configuration. For example, if security measures are desired, a number of secret codes, such as four, may be randomly selected and entered into the license information. These codes should be matched by the secret codes provided by the client 106 to gain access to an application. All of this information is stored in the license record object, which the installer maintains in confidentiality.

Figure 7:
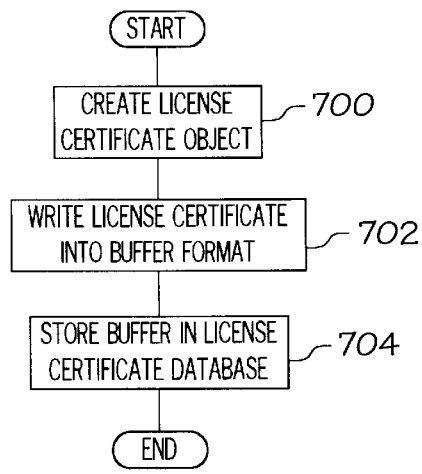
FIG. 7 is a flow diagram of a process for installing a license in the license certificate database.

Referring now to FIG. 7, upon receipt, license information is suitably stored as a collection of electronic license certificates, suitably in a common certificate binary format such as the format described above in conjunction with FIG. 3. To install the license information in NDS database 112, the LSP 110 uses the license information received from the installer to create a license certificate object to access the NDS database 112 (step 700). The license certificate object suitably includes embedded code which parses the license information and creates an executable entity. The license certificate object then executes, causing the license certificate object to be written into a buffer format recognized by the LSP 110 (step 702). The particular format may be varied to suit the particular NDS database 112 or licensing system 100. LSP 110 then saves the formatted buffer into the NDS database 112, potentially containing many other license record objects, all suitably in buffer form (step 704). The license certificate is then ready for retrieval.

As described above, various policy attributes for a license are stored in data field 308 associated with a particular license record object. The data field 308 of each license record object 302 installed in NDS database 112 suitably stores a first group of information comprising required entries, and a second group of information comprising optional entries. The structure of the required entries is suitably common among each of the license certificates. The required entries describe the application's basic information. The optional entries, on the other hand, suitably provide system specific enhancements to the standard policy.

The required entries suitably include fundamental information relating to the license record object. For example, the required entries suitably include the publisher name, product name, version, and number of license units. The required entries also suitably include a unique identifier, such as a license or serial number, to distinguish the license record object from other licenses provided by the same publisher, product, and version. The required entries may also be configured to include various policy attributes to handle the consumption of license units and error conditions.

A set of policy attributes may be included in the optional entries to describe various parameters of the license record object, for example the assignment information described above. The policy attributes stored in data field 308 facilitate the detailed and flexible description of the license terms and conditions, for example including a number of license units tag, a default units to consume tag, or a default metered tag. The descriptors may also be configured to provide various default license schemes, such as concurrent licensing, nodelocked, personal use, site restricted, and one-time use. Any suitable attributes may be included, for example:

SHAREABLE: license units decremented on request, incremented on release.

DEFAULT UNITS DESCRIPTOR: defines the default number of units to consume for one request.

MINIMUM UNITS TO CONSUME: the minimum number of units to consume from this given license object despite the number requested.

It should be noted that the optional entries preferably do not provide more restrictive policy than the required fields to eliminate incentive to install the license certificate on a less restrictive LSP.

Similarly, other attributes that may be included relate to the behavior of the system in the event of a particular error condition, which are referred to as error handling attributes. Each error handling attribute suitably describes a reaction based on conditions encountered in the acquisition of license units. These actions may be provided with parameters to control the particular reaction. For example, for demonstration purposes, an error handling attribute may allow access to an application even if insufficient units are available. Certain parameters may be installed to provide limited access, however, to limit the user's access to the application.

In a preferred configuration, a further attribute may be added to facilitate a nodal based licensing model for particular applications. In a nodal based system, a single machine, node, or user consumes a single license unit for an application regardless of the number of connections between the client and the various other components or applications, i.e., the license record certificate is reusable for simultaneous connections to different servers. In the preferred embodiment, a "re-use" attribute may be added to the license record object which indicates that the license should be reused if the license record object is already utilized by a particular node, machine, or user. As a result, a single user, machine, or node consumes a single license unit per utilization of the network, independent of the number of servers to which the user, machine, or node connects.

In addition, the required entries suitably include security information, such as encrypted authentication information. An application may be licensed with no security attributes at all. Alternatively, security attributes may be stored in data field 308, and different attributes may be provided to generate different levels of security. For example, the vendor may use the common certificate security format, which utilizes certain "secrets" incorporated into the license acquisition API to prevent unauthorized modification of the license certificate. The license acquisition API's secrets comprise a set of encrypted information, such as the license information plus an activation key, which are provided by a client to gain access to an application. In addition, an attribute may be added which requires the presence of a particular hardware security device, often referred to as a "dongle", to activate the application. Information relating to such security attributes may be included in data field 308.

In a preferred configuration, a standard RSA public/private key digital signature may be offered for higher end security. The static portion of the license record object is used to create a unique signature, which is also associated with the license record object. Consequently, by comparing the stored signature with an expected signature based on the static portion of the license record object, tampering with the license record object may be detected.

The optional entries of data field 308 may further include information relating to particular licensing systems 100. For example, data field 308 suitably includes a system specific area tag. This tag may include a unique tag associated with a particular licensing system 100, along with any information pertinent to that licensing system 100. A license certificate object encountering an unrecognized tag in this field may ignore the tag and continue processing the remainder of the information. All policy attributes are preferably additive so that they may be combined in any manner suited to the vendor or administrator to create an overall description of the application's behavior.

After the license certificates have been added to NDS database 112, the client 106 may request licenses for access to applications. Referring now to FIGS. 8A–B, when the user desires an application, the user suitably selects a name from a list or an icon, and then the application and the client 106 automatically provide suitable information corresponding to any required fields (step 802). If all information is predetermined, no further information may be required. An output destination from which the request is made is also automatically inserted into the request.

The client 106 initially checks for a connection to a compatible licensing system 100 (step 804). If none is found, an error code is returned (step 806). If the licensing system 100 is available, the client 106 bundles the request arguments for the function, along with a function number, into a buffer, and uses the RPC mechanism furnished by the client provider to send the request to LSP 110 (step 808). The request is generated using the license acquisition API and suitably specifies particular information relating to the application, such as the publisher, product, and version for which license units are requested. In addition, the API suitably indicates the number of license units requested, so that the number of units consumed is specified by the API. Client 106 transmits the request to LSP 110 and waits for a response.

LSP 110 receives the request for a number of license units from the client 106 (step 810). The particular LSP 110 receiving the request is suitably the nearest LSP, but may be any LSP in the network. The NCP handler 202 of LSP 110 receives the request and transmits it to the server stubs module 204. The server stubs module 204 transmits the parsed request to the engine code 206, which decodes the request.

After decoding the request, the engine code 206 generates a license handle object 902 and a transaction database object 908 (step 812). The license handle object includes a unique identifier associated with the transaction, which the transaction database object 908 suitably copies and stores in the transaction database 105, along with other information associated with the license request. For example, the user's NDS distinguished name and the application publisher, product, and version may be entered into the transaction database 105 and associated with the license handle. Any calls made by the client 106 utilizing the particular license handle are then logged as action corresponding to that license handle in the transaction database object 908. An action corresponding to a license handle suitably records relevant information in the transaction database 105, such as what call was made, time of the call, number of units involved, and the outcome of the call.

Engine code 206 then creates a certificate database object 904 to search the NDS database 112 (step 814). The certificate database object 904 searches the NDS database 112 for one or more license record objects relevant to the request, i.e., relating to the appropriate application (step 816). The certificate database object 904 accesses NDS database 112 and searches through the appropriate objects in the tree to determine whether the necessary license record objects have been installed. If so, the certificate database object 904 creates a license certificate object 906 using the information in the license record object.

The license certificate object 906 suitably determines whether the license units corresponding to the license record object are available to the requesting client by reviewing, for example, the policy attributes of the license, the user information associated with the request, any existing license assignments, the number of units in use, and the raw number of units originally installed.

If all of the available containers have been searched (step 822) and the appropriate license record objects cannot be located, LSP 110 returns an error message to client 106 (step 824). If sufficient license units are available among the license record objects, the license certificate objects 906 consume the detected license units. To consume the units, each license certificate object 906 checks the license information for any existing assignments. If an assignment exists in the license record object, it performs a security equivalency check to determine whether the requesting client 106 is among those assigned to the license certificate (step 828). If no match is found, the license certificate object 906 returns an error to the requesting client (step 830).

If a match is found, the license certificate object 906 consumes the license units by updating the dynamic portion of the license record object with the user information, license handle, and how many units are to be consumed (step 832). The relevant license record objects in the NDS database 112 are modified to indicate that the license units are in use. All such modifications of the license record objects are performed according to the policy attributes associated with the license record object. It should be noted, however, that certain core information in the license record object remains undisturbed, for example the number of units associated with the license. The number of units consumed is separately noted in a different field, whereas the total number of units associated with the license record object cannot be changed by the license certificate object 906.

The license unit acquisition process continues to search for license record objects until all of the required units are obtained or the necessary license record objects to proceed cannot be found. If insufficient license units were located (step 834), a detailed error code indicating the grounds for denial of the request is returned to client 106 and stored in the transactional database (step 836). If the appropriate license units are located, however, the license certificate object 906 suitably grants the license based on the various policy attributes. A resulting status code and the license handle are suitably shipped to client 106 (step 838). When the client 106 receives a response, it removes the output arguments from the output buffer, and sends the results back to the calling application.

The client 106 suitably periodically updates the license handle object 902 within the specified update period. For example, the appropriate update period may be obtained by the application using a licensing function call. In response, LSP 110 suitably returns an appropriate update period, such as the shortest update period specified by any of the stored license certificates. Updating the license handle object 902 suitably comprises a message sent to LSP 110 indicating continued use of the application. If the update fails to occur, LSP 110 treats the failure as a return of the license units. Consequently, the dynamic portion of the license record object is suitably modified to indicate that the license units are available for use by other clients, if appropriate, based on the particular licensing policy. The application then returns an error message to the client 106. The update requirement provides for abnormal termination of the application and license, such as in the event of a system crash or power loss.

When client 106 no longer requires the license units, the application transmits a release notification to LSP 110. When the release message is received by LSP 110, the license certificate object 906 marks each of the license certificates associated with the particular license handle as no longer in use. If the policy attributes permit, the license units may then be designated as available. NDS 103 then notes the release in the NDS database 112, and the transaction is complete.

A licensing system 100 according to various aspects of the present invention may also be suitably configured to provide several software metering facilities. Software metering essentially comprises enabling an application using an intermediary application. Instead of the application directly requesting a license from the LSP 110, the request is placed by the intermediary application. The intermediary application monitors usage of executables, and when it detects the usage of a "metered" executable, it requests a license from LSP 110 on behalf of the executing application. The intermediary application first maps the executable name to a publisher, product, and version name, and then requests the licensing units from LSP 110 using the standard function calls.

The intermediary application is suitably capable of requesting a fully enabled license certificate from licensing system 100. The security features, however, may be disabled, especially for a trusted environment; no security against forgery is typically required because the end user creates the license utilized by the intermediary application. In addition, the metering function typically allows unlimited access to the metered application.

When the intermediary application accepts a request for an application, the intermediary application enters the information about the product into licensing system 100. This includes all of the information contained in a typical license certificate, including the number of units and any policy descriptions which help describe the license attributes. A licensing function call is used in the intermediary application which allows the software metering system to directly enter information into the NDS database 112. The function call suitably allows entry of all information relevant to the product, including the publisher, product, version, units, and policy attributes. Security information, however, is typically not facilitated through the intermediary application, which allows the metering information to be distinguished from information obtained by the installation of license certificates created by a manufacturer. This also provides security against an end user directly entering information for a vendor licensed application which requires a vendor supplied license certificate. The metering utility is also suitably responsible for mapping an executable name to a publisher, product, and version. The software metering system is also suitably responsible for gathering the information about application to be metered and for performing the call which translates that information into licensing system's 100 database.

The software metering system configuration is particularly useful to determine the usage of individual applications in an enterprise network environment, which applications are installed on a network, and which users are using them. In addition, it is often desirable for licensing system 100 to inform the administrator of any error conditions which may have occurred during the execution of any relevant software. Tracking software usage is facilitated by the transaction database, which is suitably organized such that all actions performed by a single application in a particular execution session and utilizing a particular license handle are grouped together. A software asset management system may read entries from the transaction database through a set of function calls. The database is suitably chronologically organized based on the time at which the first action in a transaction occurred. Examples of actions to be recorded include the request for license units, granting of license units, updates, and release of license units. The individual entries in the transaction database may be assembled into the required usage information and presented to the user or administrator. Similarly, information regarding errors are also placed in the transaction database. Errors are suitably recorded in the transaction record of the application which generated the error condition. Every transaction entry, including requests and errors, suitably contains information about the user which generated the action. Consequently, the administrator may track which users are not appropriately authorized or are suffering multiple error conditions.

An electronic licensing system according to various aspects of the present invention thus provides a distributed database among several servers. As a result, any given server is unlikely to be overloaded as a licensing server. In addition, license information may be coupled with any desired attributes to create a desired licensing policy. Because the client merely bundles the arguments for a license request and transmits them to the server, client resources are preserved. In addition, recoverability of the system is enhanced. All pertinent information is stored in the NDS database. To reestablish the license application, the client only needs to store the license handle associated with the license request. Further, in the event of a crash of a server, the distributed database using the replicating directory service provides for a high degree of fault tolerance.

While the principles of the invention have now been made clear in illustrative embodiments, there will be immediately obvious to those skilled in the art many modifications of structure, arrangements, proportions, the elements, materials and components, used in the practice of the invention which are particularly adapted for a specific environment and operating requirements without departing from those principles.

We claim:

1. An electronic licensing system for providing access to a plurality of applications in a computer network environment, comprising:

a distributed license database configured to store authorization parameters relating to usage of the plurality of applications, wherein information stored in said distributed licensed database is replicated, each replica being stored on a separate computer;

a license service provider configured to receive requests, search said distributed license database for authorization parameters corresponding to said received request, and facilitate access to the application only if the corresponding authorization parameters are stored in said distributed license database; and a client configured to generate a request for access to one of said plurality of applications and transmit said request to said license service provider, wherein said request includes:
   a generic request structure for requesting access to any of said plurality of applications, and
   at least one identification parameter embedded in said generic structure corresponding to said requested application.

2. The electronic licensing system of claim 1, wherein said client includes an API configured to generate said request.

3. The electronic licensing system of claim 1, wherein said at least one identification parameter includes a publisher indicator, a product indicator, and a version indicator.

4. The electronic licensing system of claim 1, wherein said license service provider is configured to generate a separate certificate database object for each request generated by said client, wherein each certificate database object generated is configured to search said distributed license database for said authorization parameters, and wherein each certificate database object is an executable entity.

5. The electronic licensing system of claim 1, wherein said authorization parameters are stored in said license database according to a uniform format.

6. The electronic licensing system of claim 1, further comprising a transaction database configured to store information relating to said request.

7. The electronic licensing system of claim 6, wherein said license service provider is configured to assign a unique identifier to said request and store said unique identifier in said transaction database.

8. The electronic licensing system of claim 1, further comprising a transaction database configured to store information relating to said request.

9. The electronic licensing system of claim 8, wherein said license service provider is configured to assign a unique identifier to said request and store said unique identifier in said transaction database.

10. An electronic licensing system for providing access to a plurality of applications in a computer network environment, comprising:
   a client configured to generate a plurality of requests, each request corresponding to at least one of the plurality of applications;
   a distributed license database configured to store authorization parameters relating to usage of the plurality of applications, wherein said authorization parameters are stored on a plurality of computers; and
   a license service provider configured to receive said requests from said client and generate a separate certificate database object for each of said requests, wherein said certificate database object is an executable entity configured to search said license database for authorization parameters corresponding to the received request and facilitate access to the application only if the corresponding authorization parameters are stored in said license database.

11. The electronic licensing system of claim 10, wherein said client includes an API configured to generate said request.

12. The electronic licensing system of claim 10, wherein said request includes a product indicator, a version indicator, and a source indicator corresponding to the requested application.

13. The electronic licensing system of claim 10, wherein said authorization parameters are stored in said license database according to a uniform format.

14. The electronic licensing system of claim 10, wherein said authorization parameters are automatically stored on at least two of said computers.

15. An electronic licensing system for providing access to a plurality of applications in a computer network environment, comprising:
   a client configured to generate a plurality of requests for at least one of a plurality of applications;
   a distributed license database configured to store authorization parameters relating to usage of the plurality of applications, wherein said authorization parameters are copied to multiple locations in said distributed license database;
   a certificate database object corresponding to each of said requests generated by said client, each certificate database object being configured to search said license database for matching authorization parameters corresponding to said client request, wherein said certificate database object is an executable entity; and
   a licensed certificate object generated by said certificate database object for each client request having matching authorization parameters.

16. The electronic licensing system of claim 15, wherein said client includes an API configured to generate said request.

17. The electronic licensing system of claim 15, wherein said request includes a product indicator, a version indicator, and a source indicator.

18. The electronic licensing system of claim 15, wherein said authorization parameters are stored in said license database according to a uniform format.

19. The electronic licensing system of claim 15, wherein said authorization parameters are automatically copied to multiple locations in said distributed license database.

20. A method of providing access to software applications in a computer network environment, comprising the steps of:
   storing a plurality of authorization parameters relating to the applications in a license database distributed across a plurality of computers;
   requesting access to at least one of said applications;
   generating a certificate database object in response to the requesting step, said certificate database object being operative for searching said license database for parameters corresponding to said requested access; and
   when corresponding parameters are found by the certificate database object, generating a licensed certificate object, said licensed certificate object being operative for determining whether to allow access to said application by reviewing license information associated with the requested application.

21. The method of claim 20, wherein said step of storing said plurality of authorization parameters includes the steps of:
   creating a local license certificate database in each of said plurality of computers;
   writing authorization parameters associated with each of the applications into a buffer format; and
   storing said formatted authorization parameters into said local license certificate database.

22. The method of claim 20, further comprising the steps of:
   assigning a license handle to said requested access;
   storing said license handle in a transaction database; and
   providing said license handle to the source of said requested access.

* * * * *